US009522845B2

(12) United States Patent
Herold et al.

(10) Patent No.: US 9,522,845 B2
(45) Date of Patent: Dec. 20, 2016

(54) COATING AGENTS FOR PRODUCING PERMANENTLY FLEXIBLE COATINGS

(75) Inventors: Hardy Herold, Burghausen (DE); Roland Schickor, Simbach (DE)

(73) Assignee: Wacker Chemie AG, Munich (DE)

( * ) Notice: Subject to any disclaimer, the term of this patent is extended or adjusted under 35 U.S.C. 154(b) by 652 days.

(21) Appl. No.: 13/823,459

(22) PCT Filed: Sep. 12, 2011

(86) PCT No.: PCT/EP2011/065737
§ 371 (c)(1),
(2), (4) Date: Mar. 14, 2013

(87) PCT Pub. No.: WO2012/038288
PCT Pub. Date: Mar. 29, 2012

(65) Prior Publication Data
US 2013/0183448 A1    Jul. 18, 2013

(30) Foreign Application Priority Data
Sep. 23, 2010   (DE) .................. 10 2010 041 293

(51) Int. Cl.
| C04B 28/02 | (2006.01) |
|---|---|
| C04B 28/04 | (2006.01) |
| C04B 40/00 | (2006.01) |
| C04B 24/06 | (2006.01) |
| C04B 24/04 | (2006.01) |
| C04B 24/26 | (2006.01) |
| C04B 14/06 | (2006.01) |
| C04B 14/10 | (2006.01) |
| C04B 14/28 | (2006.01) |
| C04B 40/06 | (2006.01) |
| C04B 24/02 | (2006.01) |
| C04B 103/50 | (2006.01) |

(52) U.S. Cl.
CPC ............... *C04B 24/06* (2013.01); *C04B 14/06* (2013.01); *C04B 14/066* (2013.01); *C04B 14/104* (2013.01); *C04B 14/28* (2013.01); *C04B 24/02* (2013.01); *C04B 24/04* (2013.01); *C04B 24/2623* (2013.01); *C04B 24/2641* (2013.01); *C04B 24/2682* (2013.01); *C04B 28/02* (2013.01); *C04B 28/04* (2013.01); *C04B 40/0042* (2013.01); *C04B 40/0608* (2013.01); *C04B 2103/50* (2013.01)

(58) Field of Classification Search
CPC ...... C04B 28/02; C04B 28/04; C04B 40/0042; C04B 24/06; C04B 24/04; C04B 24/2682; C04B 14/06; C04B 14/066; C04B 14/104; C04B 14/28; C04B 24/2623; C04B 40/0608; C04B 24/02; C04B 24/2641; C04B 2103/50
USPC ........................................................ 524/284
See application file for complete search history.

(56) References Cited

U.S. PATENT DOCUMENTS

| 4,430,463 A | 2/1984 | Mullenax |
|---|---|---|
| 4,710,526 A | 12/1987 | Tokumoto et al. |
| 4,859,751 A | 8/1989 | Schulze et al. |
| 5,484,478 A | 1/1996 | Brothers |
| 5,543,188 A | 8/1996 | Te'eni |
| 6,166,113 A | 12/2000 | Haerzschel et al. |
| 6,291,573 B1 * | 9/2001 | Pakusch .............. C04B 24/2676 524/503 |
| 2004/0097622 A1 | 5/2004 | Weitzel |
| 2006/0054059 A1 | 3/2006 | Dubey et al. |
| 2007/0037925 A1 | 2/2007 | Weitzel et al. |
| 2008/0060299 A1 | 3/2008 | Dubey et al. |
| 2009/0155472 A1 | 6/2009 | Grasse et al. |

FOREIGN PATENT DOCUMENTS

| DE | 196 20 817 A1 | 11/1997 |
|---|---|---|
| DE | 101 01 314 A1 | 8/2002 |
| DE | 10 2005 053 336 A1 | 5/2007 |
| DE | 10 2008 043 988 A1 | 5/2010 |
| EP | 0 149 098 A2 | 7/1985 |
| EP | 1 420 001 A1 | 5/2004 |
| EP | 1 614 670 A2 | 1/2006 |
| GB | 1 236 263 | 6/1971 |
| KR | 10-0913255 B1 | 8/2009 |
| WO | 2004/092094 A1 | 10/2004 |

OTHER PUBLICATIONS

English-language patent abstract for KR 10-0913255 B1.
English-language patent abstract for DE 10 2008 043 988 A1.
English-language patent abstract for DE 101 01 314 A1.
English-language patent abstract for EP 1 614 670 A2.
Fox T.G., Bull. Am. Physics Soc. 1, 3, p. 123 (1956).
Lee et al., "The Glass Transition Temperature of Polymers," in Polymer Handbook 2nd Edition (Brandup et al. eds., J. Wiley & Sons, New York (1975)), pp. III-139-III-191.
E. W. Flick, Water Soluble Resins—an Industrial Guide, Noyes Publications, Park Ridge, N.J. 1991.
International Search Report for PCT/EP2011/065737 dated Dec. 13, 2011.

* cited by examiner

*Primary Examiner* — Angela C Scott
(74) *Attorney, Agent, or Firm* — Caesar Rivise, PC

(57) ABSTRACT

The invention relates to coating agents based on one or more mineral binders, one or more polymers, one or more fillers, and optionally one or more additives. The invention is characterized in that the coating agents contain 0.05 to 5 wt. %, with respect to the dry weight of the coating agents, of one or more flexibilizers selected from the group comprising hydroxy compounds with 1 to 25 carbon atoms, carboxylic acid compounds with 1 to 25 carbon atoms or the salts thereof, hydroxy carboxylic acid compounds with 1 to 25 carbon atoms or the salts thereof, phosphonic acids or the salts thereof, and phosphoric acids or the salts thereof, and at least 55 wt % polymers, with respect to the dry weight of the polymers and the mineral binders.

12 Claims, No Drawings

COATING AGENTS FOR PRODUCING PERMANENTLY FLEXIBLE COATINGS

BACKGROUND OF THE INVENTION

The invention relates to coating compositions based on mineral binders, polymers and fillers, to processes for producing coatings, and to water-redispersible dispersion powder compositions, processes for preparing them, and their use in the aforementioned coating compositions.

The use is known in the construction sector of coating compositions based on mineral binders, polymers and fillers for producing flexible coatings. Coating compositions of this kind are used, for example, as grouts, as described in U.S. Pat. No. 6,166,113 or DE-A 19620817. U.S. Pat. No. 4,710,526 discloses mortar compositions based on cement and cationic polymers for producing flexible coatings having good adhesive properties. KR 100913255 describes cementitious, polymer-modified mortar compositions for producing construction products having superior mechanical and chemical resistance. GB 1236263 discloses compositions based on mineral binders, fillers and polymers and also additives, such as hydroxy-carboxylic acids. U.S. Pat. No. 5,543,188 recommends membranes comprising a polymer layer that are impregnated with cementitious dry mixes. US 2008/0060299 and US 2006/0054059 describe flexible membranes based on mats made of plastic and equipped with flexible, cementitious, polymer-modified coatings. U.S. Pat. No. 5,484,478 recommends polycarboxylic acids comprising phosphpinic acid units as setting retarders for cementitious grouts, and the use thereof in petroleum extraction.

The existing coating compositions, however, result in coatings which over time slowly become brittle and hence are not permanently flexible. The embrittlement is manifested in a fall-off in the elongation at break or crack-bridging ability of the coatings. The crack-bridging properties of the coatings are essential, however, in order to protect the coated substrates. Cracks may be formed in the substrates, such as constructions, as a consequence of earthquakes, contraction processes, hygrothermal changes in length, or aging processes, or of other mechanical impositions. The flexible coatings are intended to bridge cracks of this kind and thereby to prevent water penetration into the substrates. If, however, the coatings have now become brittle and are therefore no longer flexible, the coatings themselves tend to crack over the course of time, or develop other kinds of damage, thereby allowing water to penetrate through the coatings into the underlying substrates, with the consequence of corresponding water damage. As a result of the embrittlement, then, the coatings no longer fulfill their purpose, or do so inadequately. Embrittlement occurs to an increased extent when the coatings are subject to damp or even to wet conditions. With permanently flexible coatings, i.e., coatings which have a durable flexibility, such damage ought to be prevented.

Against this background, the object was to provide coating compositions for producing permanently flexible coatings that are less susceptible to embrittlement, not least under damp or wet conditions, and, consequently, are durably flexible.

DESCRIPTION OF THE INVENTION

The invention first provides coating compositions based on one or more mineral binders, one or more polymers, one or more fillers and optionally one or more additives, characterized in that the coating compositions comprise 0.05% to 5% by weight, based on the dry weight of the coating compositions, of one or more flexibilizers selected from the group encompassing hydroxy compounds having 1 to 25 carbon atoms, carboxylic acid compounds having 1 to 25 carbon atoms, or salts thereof, hydroxy-carboxylic acid compounds having 1 to 25 carbon atoms, or salts thereof, phosphonic acids or salts thereof, and phosphoric acids or salts thereof, and at least 55% by weight of polymers, based on the dry weight of the polymers and of the mineral binders.

Hydroxy compounds generally comprise one or more alcohol groups, i.e. one or more OH groups bonded to carbon atoms. Carboxylic acid compounds, as is known, comprise one or more —COOH groups, bonded preferably to carbon atoms. Hydroxy-carboxylic acid compounds comprise at least one alcohol group and at least one COOH group. The hydroxy-carboxylic acid compounds may optionally be present in the form of lactones. Lactones are intramolecular, cyclic esters of hydroxy-carboxylic acid compounds in which an alcohol group and a carboxylic acid group of a hydroxy-carboxylic acid compound are linked to one another to form a ring, and so form an ester group. Hydroxy-carboxylic acid compounds and their lactones may also be present alongside one another. The hydroxy, carboxylic acid or hydroxy-carboxylic acid compounds may optionally carry further groups, such as aldehyde groups or keto groups, for example.

The carboxylic acid compounds, hydroxy-carboxylic acid compounds, phosphonic acids or phosphoric acids may be present, for example, in the form of their alkali metal salts, alkaline earth metal salts or ammonium salts, such as sodium, potassium, magnesium, calcium or ammonia salts.

Preferred flexibilizers are hydroxy-carboxylic acid compounds, phosphonic acids or phosphoric acids, or their respective salts.

The hydroxy compounds, the carboxylic acid compounds or the hydroxy-carboxylic acid compounds comprise preferably 2 to 10 carbon atoms, more preferably 2 to 8 carbon atoms and most preferably 2 to 6 carbon atoms. The hydroxy compounds or the hydroxy-carboxylic acid compounds preferably carry 1 to 6, more preferably 1 to 5, hydroxyl groups. The carboxylic acid compounds or the hydroxy-carboxylic acid compounds preferably carry 1 to 3 carboxylic acid groups.

Examples of suitable carboxylic acid compounds are oxalic acid, tartaric acid, gluconic acid, heptonic acid, gallic acid, citric acid, succinic acid, sebacic acid, salicylic acid, pimelic acid, hematic acid or malic acid. Preference is given to tartaric acid, gluconic acid and citric acid.

Examples of suitable hydroxy compounds are pentaerythritol, sorbitol, sucrose, glucose, fructose or disaccharides, such as saccharose. Preference is given to fructose and saccharose (cane sugar).

Examples of suitable phosphonic acids or phosphoric acids or salts thereof are tetrasodium pyrophosphate and tetrapotassium pyrophosphate, and sodium hexametaphosphate (Graham's salt).

Most-preferred examples of flexibilizers are gluconic acid, tartaric acid and citric acid, or their respective salts.

Polymers used are generally addition polymers of one or more ethylenically unsaturated monomers (base polymers). Preferred ethylenically unsaturated monomers are selected from the group encompassing vinyl esters, (meth)acrylic esters, vinylaromatics, olefins, 1,3-dienes and vinyl halides and optionally further monomers copolymerizable therewith.

Suitable vinyl esters are, for example, those of carboxylic acids having 1 to 15 C atoms. Preferred are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 11 C atoms, for example VeoVa9® or VeoVa10® (trade names of the company Resolution). Particularly preferred is vinyl acetate.

Suitable monomers from the group of acrylic esters or methacrylic esters are, for example, esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate. Particularly preferred are methyl acrylate, methyl methacrylate, n-butyl acrylate, tert-butyl acrylate and 2-ethylhexyl acrylate.

Preferred vinylaromatics are styrene, methylstyrene and vinyltoluene. Preferred vinyl halide is vinyl chloride. The preferred olefins are ethylene, propylene, and the preferred dienes are 1,3-butadiene and isoprene.

Optionally it is also possible for 0% to 10% by weight, based on the total weight of the monomer mixture, of auxiliary monomers to be copolymerized. It is preferred to use 0.1% to 5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carbonitriles, preferably acrylamide and acrylonitrile; monoesters and diesters of fumaric acid and maleic acid, such as the diethyl and diisopropyl esters, and also maleic anhydride; ethylenically unsaturated sulfonic acids and/or their salts, preferably vinylsulfonic acid, 2-acrylamido-2-methylpropanesulfonic acid. Further examples are precrosslinking comonomers such as polyethylenically unsaturated comonomers, examples being diallyl phthalate, divinyl adipate, diallyl maleate, allyl methacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylol-methacrylamide, N-methylol allylcarbamate, alkyl ethers such as the isobutoxy ether or esters of N-methylolacrylamide, of N-methylolmethacrylamide and of N-methylol allylcarbamate. Also suitable are epoxide-functional comonomers such as glycidyl methacrylate and glycidyl acrylate. Further examples are silicon-functional comonomers, such as acryloyloxypropyltri(alkoxy)- and methacryloyloxy-propyltri(alkoxy)silanes, vinyltrialkoxysilanes and vinylmethyldialkoxysilanes, where alkoxy groups that may be present include, for example, ethoxy radicals and ethoxypropylene glycol ether radicals. Mention may also be made of monomers having hydroxyl groups or CO groups, examples being hydroxyalkyl acrylates and methacrylates such as hydroxyethyl, hydroxypropyl or hydroxybutyl acrylate or methacrylate, and also compounds such as diacetoneacrylamide and acetylacetoxyethyl acrylate or methacrylate.

Preference is given to one or more polymers selected from the group encompassing vinyl ester homopolymers, vinyl ester copolymers comprising one or more monomer units from the group encompassing vinyl esters, olefins, vinyl aromatics, vinyl halides, acrylic esters, methacrylic esters, fumaric and/or maleic monoesters or diesters; (meth)acrylic ester homopolymers, (meth)acrylic ester copolymers comprising one or more monomer units from the group encompassing methacrylic esters, acrylic esters, olefins, vinylaromatics, vinyl halides, fumaric and/or maleic monoesters or diesters; homopolymers or copolymers of dienes such as butadiene or isoprene, and also of olefins such as ethene or propene, it being possible for the dienes to be copolymerized with, for example, styrene, (meth)acrylic esters or the esters of fumaric or maleic acid; homopolymers or copolymers of vinylaromatics, such as styrene, methylstyrene, vinyltoluene; homopolymers or copolymers of vinylhalogen compounds such as vinyl chloride, it being possible for the polymers also to contain auxiliary monomers.

Particular preference is given to copolymers of one or more vinyl esters with 1% to 50% by weight of ethylene; copolymers of vinyl acetate with 1% to 50% by weight of ethylene and 1% to 50% by weight of one or more further comonomers from the group of vinyl esters having 1 to C atoms in the carboxylic acid radical, such as vinyl propionate, vinyl laurate, vinyl esters of alpha-branched carboxylic acids having 9 to 13 C atoms, such as VeoVa9, VeoVa10, VeoVa11; copolymers of one or more vinyl esters, 1% to 50% by weight of ethylene and preferably 1% to 60% by weight of (meth)acrylic esters of unbranched or branched alcohols having 1 to 15 C atoms, more particularly n-butyl acrylate or 2-ethylhexyl acrylate; and copolymers with 30% to 75% by weight of vinyl acetate, 1% to 30% by weight of vinyl laurate or vinyl esters of an alpha-branched carboxylic acid having 9 to 11 C atoms, and also 1% to 30% by weight of (meth)acrylic esters of unbranched or branched alcohols having 1 to 15 C atoms, more particularly n-butyl acrylate or 2-ethylhexyl acrylate, which also contain 1% to 40% by weight of ethylene; copolymers with one or more vinyl esters, 1% to 50% by weight of ethylene and 1% to 60% by weight of vinyl chloride; the polymers may further comprise the stated auxiliary monomers in the stated amounts, and the amounts in % by weight add up to 100% by weight in each case.

Particular preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate; styrene-acrylic ester copolymers with one or more monomers from the group of methyl acrylate, ethyl acrylate, propyl acrylate, n-butyl acrylate, 2-ethylhexyl acrylate; vinyl acetate-acrylic ester copolymers with one or more monomers from the group of methyl acrylate, ethyl acrylate, propyl acrylate, n-butyl acrylate, 2-ethylhexyl acrylate and optionally ethylene; styrene-1,3-butadiene copolymers; the polymers may further comprise auxiliary monomers in the stated amounts, and the amounts in % by weight add up to 100% by weight in each case.

Examples of particularly preferred comonomers for vinyl chloride copolymers are α-olefins, such as ethylene or propylene, and/or vinyl esters, such as vinyl acetate, and/or acrylic esters or methacrylic esters of alcohols having 1 to 15 C atoms, such as methyl acrylate, methyl methacrylate, ethyl acrylate, ethyl methacrylate, propyl acrylate, propyl methacrylate, n-butyl acrylate, tert-butyl acrylate, n-butyl methacrylate, tert-butyl methacrylate, 2-ethylhexyl acrylate and/or fumaric and/or maleic monoesters or diesters such as the dimethyl, methyl tert-butyl, di-n-butyl, di-tert-butyl and diethyl esters of maleic acid or fumaric acid, respectively.

Most preferred are copolymers with vinyl acetate and 5% to 50% by weight of ethylene; or copolymers with vinyl acetate, 1% to 50% by weight of ethylene and 1% to 50% by weight of a vinyl ester of α-branched monocarboxylic acids having 9 to 11 C atoms; or copolymers with 30% to 75% by weight of vinyl acetate, 1% to 30% by weight of vinyl laurate or vinyl esters of an alpha-branched carboxylic acid having 9 to 11 C atoms, and also 1% to 30% by weight of (meth)acrylic esters of unbranched or branched alcohols having 1 to 15 C atoms which further contain 1% to 40% by weight of ethylene; or copolymers with vinyl acetate, 5% to 50% by weight of ethylene and 1% to 60% by weight of vinyl chloride.

Most-preferred copolymers are also vinyl chloride-ethylene copolymers containing 60% to 98% by weight of vinyl chloride units and 1% to 40% by weight of ethylene units, the amounts in % by weight being based on the total weight of the copolymer and adding up to 100% by weight in each case. Vinyl chloride-ethylene copolymers of this kind are known from EP 0 149 098 A2.

The monomer selection and the selection of the weight fractions of the comonomers are made such as to result in a glass transition temperature, Tg, of −50° C. to +30° C., preferably −40° C. to +10° C., more preferably −30° C. to 0° C. The glass transition temperature Tg of the polymers can be determined in a known way by means of Differential Scanning calorimetry (DSC). The Tg may also be calculated approximately in advance by means of the Fox equation. According to Fox T. G., Bull. Am. Physics Soc. 1, 3, page 123 (1956), the following holds: $1/Tg=x1/Tg1+x2/Tg2+ \ldots +xn/Tgn$, where xn is the mass fraction (% by weight/100) of the monomer n, and Tgn is the glass transition temperature, in kelvins, of the homopolymer of the monomer n. Tg values for homopolymers are listed in Polymer Handbook 2nd Edition, J. Wiley & Sons, New York (1975).

The polymers are prepared generally in aqueous medium and preferably by the emulsion or suspension polymerization process—as described in DE-A 102008043988, for example. The polymers in these cases are obtained in the form of aqueous dispersions. During the polymerization it is possible to use the common protective colloids and/or emulsifiers, as described in DE-A 102008043988. The protective colloids may be anionic or preferably cationic or nonionic. Preference is also given to combinations of cationic and nonionic protective colloids. Preferred nonionic protective colloids are polyvinyl alcohols. Preferred cationic protective colloids are polymers which carry one or more cationic charges, as described in E. W. Flick, Water Soluble Resins—an Industrial Guide, Noyes Publications, Park Ridge, N.J., 1991, for example. Preferred as protective colloids are partially hydrolyzed or fully hydrolyzed polyvinyl alcohols having a degree of hydrolysis of 80 to 100 mol %, more particularly partially hydrolyzed polyvinyl alcohols having a degree of hydrolysis of 80 to 94 mol % and a Höppler viscosity, in 4% strength aqueous solution, of 1 to 30 mPas (Höppler method at 20° C., DIN 53015). The stated protective colloids are obtainable by means of processes known to the skilled person, and are added generally in an amount totaling 1% to 20% by weight, based on the total weight of the monomers, in the polymerization.

Polymers in the form of water-redispersible polymer powders are obtainable by drying polymers in the form of aqueous dispersions, optionally following addition of protective colloids as a drying aid, with drying taking place by means, for example, of fluidized-bed drying, freeze drying or spray drying. The dispersions are preferably spray-dried. This spray-drying takes place in customary spray-drying units, in which atomization may take place by means of one-fluid, two-fluid or multi-fluid nozzles or with a rotating disk. The exit temperature selected is generally in the range from 45° C. to 120° C., preferably 60° C. to 90° C., depending on unit, Tg of the resin, and desired degree of drying.

Generally speaking, the drying aid (protective colloid) is used in a total amount of 3% to 30% by weight, based on the polymeric constituents of the dispersion. It is preferred to use 5% to 20% by weight, based on the polymer fraction.

Suitable drying aids are partially hydrolyzed polyvinyl alcohols; polyvinylpyrrolidones; polysaccharides in water-soluble form such as starches (amylose and amylopectin), celluloses and their carboxymethyl, methyl, hydroxyethyl and hydroxypropyl derivatives; proteins such as casein or caseinate, soya protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and the water-soluble copolymers thereof; melamine-formaldehyde-sulfonates, naphthalene-formaldehyde-sulfonates, styrene-maleic acid copolymers and vinyl ether-maleic acid copolymers. It is preferred not to use any protective colloids other than polyvinyl alcohols as drying aid, with the polyvinyl alcohols that are preferred as protective colloids also being used preferably as drying aid.

In the course of the spraying to dry aqueous polymer dispersions it has often proven useful to have an amount of up to 3% by weight of antifoam agent, based on the base polymer. To prolong the shelf life by improving the blocking stability, particularly in the case of polymer powders having a low glass transition temperature, the resulting polymer powder can be furnished with an antiblocking agent (anticaking agent), preferably at up to 30% by weight, based on the total weight of polymeric constituents. Examples of antiblocking agents are Ca or Mg carbonate, talc, gypsum, silica, kaolins, metakaolin, calcined kaolin, and silicates having particle sizes preferably in the range from 10 nm to 100 μm.

The viscosity of the mixture to be dried is set by way of the solids content so as to give a value of <1500 mPas (Brookfield viscosity at 20 revolutions and 23° C.), preferably <500 mPas. The solids content of the mixture to be dried is >35%, preferably >40%.

To improve the performance properties it is possible to add other adjuvants in the course of drying. Further constituents present in preferred embodiments of dispersion powder compositions are, for example, pigments, fillers, foam stabilizers, hydrophobizing agents or cement plasticizers.

The invention further provides water-redispersible dispersion powder compositions based on one or more polymers of one or more ethylenically unsaturated monomers (base polymers), characterized in that one or more flexibilizers are present.

The proportion of the flexibilizers, based on the total weight of the dispersion powder compositions, is preferably 0.025% to 12.5% by weight, more preferably 0.05% to 7.5% by weight and most preferably 0.125% to 5% by weight.

The proportion of the polymeric constituents, based on the total weight of the dispersion powder compositions, is preferably 50% to 99.975% by weight, more preferably 70 to 99.95% by weight and most preferably 80% to 99.875% by weight. Polymeric constituents encompass the base polymers and optionally protective colloids.

The present invention additionally provides processes for preparing the water-redispersible dispersion powder compositions by means of emulsion polymerization or suspension polymerization of one or more ethylenically unsaturated monomers in aqueous medium and subsequent drying of the resultant aqueous dispersions, characterized in that one or more flexibilizers are admixed.

The emulsion or suspension polymerization and the drying may here be carried out as described above. In this context it is also possible for the above-mentioned protective colloids, emulsifiers, drying aids, antifoam agents, antiblocking agents, adjuvants or other constituents to be employed accordingly, preferably in the amounts stated above.

The flexibilizers can be mixed with the ethylenically unsaturated monomers before the polymerization is initiated. As an alternative to this, the flexibilizers may be added during the polymerization of the ethylenically unsaturated monomers. It is also possible for a portion of the flexibilizers to be admixed to the ethylenically unsaturated monomers before the polymerization is initiated, and for the remaining portion of the flexibilizers to be added during the polymerization of the ethylenically unsaturated monomers.

The flexibilizers are added preferably after the end of the polymerization, to the corresponding polymer dispersion. With particular preference, the flexibilizers are added before the polymer dispersion is dried. This is done by adding one or more flexibilizers to the aqueous polymer dispersions, before then drying the resulting mixtures in accordance with the drying methods set out above. In an alternative, particularly preferred embodiment it is possible for one or more flexibilizers to be added during the drying of the aqueous polymer dispersions as well.

As an alternative to that, it is also possible for the dried polymer powders to be mixed with one or more flexibilizers. This procedure is especially appropriate when the flexibilizers are present in the form of solids.

The water-redispersible dispersion powder compositions comprising flexibilizers are suitable with particular advantage for use in the coating compositions of the invention, because the polymers and the flexibilizers can be used to produce the coating compositions on the building site and/or at the premises of the producer of the dry mortar mixture, as a single component, and no longer have to be handled as two separate components. This simplifies the (building-site) logistics.

Suitable mineral binders are, for example, cement, more particularly portland cement, aluminate cement, especially calcium sulfoaluminate cement, trass cement, slag cement, magnesia cement, phosphate cement, and blast furnace cement, and also mixed cements, filler cements, flyash, microsilica, slag sand, lime or gypsum. Preferred mineral binders is cement, more particularly portland cement, aluminate cement, especially calcium sulfoaluminate cement, trass cement, slag cement, magnesia cement, phosphate cement, and blast furnace cement, and also mixed cements, filler cements.

The proportion of aluminate cement is preferably 0% to 50% by weight, more preferably 0% to 35% by weight, very preferably 0% to 25% by weight, even more preferably 0% to 10% by weight and most preferably 0% to 5% by weight, based on the total weight of the mineral binders. In one particularly preferred embodiment the mineral binders comprise no aluminate cement.

Examples of suitable fillers are quartz sand, finely ground quartz, finely ground limestone, calcium carbonate, dolomite, clay, chalk, white lime hydrate, talc or mica, granulated rubber or hard fillers, such as aluminum silicates, corundum, basalt, carbides, such as silicon carbide or titanium carbide, or fillers which give a pozzolanic reaction, such as flyash, metakaolin, microsilica. As fillers, preference is given to quartz sand, finely ground quartz, finely ground limestone, calcium carbonate, calcium magnesium carbonate (dolomite) or chalk. The fillers preferably comprise no gravel. Gravel generally has average particle diameters of $\geq 4$ mm.

It is also possible to use any desired mixtures of the stated fillers. Preferred mixtures comprise one or more silicatic fillers, such as sand, and one or more carbonatic fillers selected from the group encompassing calcium carbonate, chalk, dolomite and limestone.

Preferred mixtures comprise one or more silicatic fillers and one or more carbonatic fillers in a ratio from 1:1 to 4:1.

The fillers preferably have average particle diameters of 0.01 to 4 mm, more preferably 0.02 to 3 mm and most preferably 0.03 to 2 mm.

Preferably at least 50% to 100% by weight of the fillers have a diameter of 0.001 to 0.5 mm; more preferably at least 70% to 100% by weight of the fillers have a diameter of 0.01 to 0.3 mm; these figures are based in each case on the dry weight of the total fillers employed. As a consequence of the filler particle diameters according to the invention, the coating compositions undergo reduced shrinkage in the course of the production of the permanently flexible coatings, and this counteracts cracking within the permanently flexible coatings and is conducive to crack bridging.

Typical formulas for the coating compositions comprise preferably 10% to 60% by weight, more preferably 20% to 55% by weight and most preferably 30% to 50% by weight of polymers; preferably 2% to 30% by weight, more preferably 2% to 20% by weight and most preferably 3% to 15% by weight of mineral binders; preferably 10% to 80% by weight, more preferably 20% to 70% by weight and most preferably 40% to 60% by weight of fillers; preferably 0.01% to 5% by weight, more preferably 0.02% to 3% by weight and most preferably 0.05% to 2% by weight of flexibilizers; the amounts in % by weight here relate to the dry weight of the coating compositions and add up in total to 100% by weight.

Relative to the polymers, the flexibilizers are present in the coating compositions at preferably 0.025% to 12.5% by weight, more preferably 0.05% to 7.5% by weight and most preferably 0.125% to 5% by weight.

Polymers are present in the coating compositions preferably at 55% to 98% by weight, more preferably 60% to 98% by weight and most preferably 70% to 98% by weight, based on the dry weight of the polymers and of the mineral binders.

The coating compositions are preferably in the form of dry mixes. The coating compositions are generally converted into aqueous coating compositions directly prior to their application, by addition of water.

Aqueous coating compositions comprise preferably 15% to 50% by weight and more preferably 20% to 40% by weight of water, based on the dry weight of the coating compositions.

The performance properties of the coating compositions may be improved by means of additives or adjuvants. Examples of suitable additives include pigments, especially inorganic pigments, such as oxide pigments, oxide hydroxide pigments, sulfide pigments, sulfoselenide pigments, carbonate pigments, chromate pigments, mixed-phase chromate-molybdate pigments, or silicate pigments. Preferred pigments in this context are pigments comprising titanium, iron, chromium or cadmium. The most preferred pigments are titanium dioxide.

Examples of suitable additives are highly disperse silicas, also known under the abbreviation HDK, such as, for example, fumed silica or precipitated silica. Highly disperse silicas are present in the coating compositions preferably at 0.1% to 3% and more preferably at 0.1% to 1% by weight, based on the dry weight of the respective coating compositions. By using highly disperse silicas it is possible to prevent further the penetration of water into the flexible coatings. Furthermore, the highly disperse silicas also have advantageous consequences for the processing properties, since corresponding aqueous coating compositions are less tacky and dry out more quickly in the course of the setting of the mineral binders.

A preferred additive also are phyllosilicates. Coating compositions comprising phyllosilicates lead to flexible coatings having a higher degree of imperviousness to water. Phyllosilicates are present preferably at 0% to 3% by weight and more preferably at 0.1% to 2% by weight, based on the dry weight of the coating compositions.

Preferred additives are also fibers. Examples of suitable fibers are Kevlar, viscose fibers, polyamide fibers, polyester fibers, polyacrylonitrile fibers, Dralon fibers, polyethylene fibers, polypropylene fibers, polyvinyl alcohol fibers, aramid fibers or carbon fibers. Fibers are present preferably at 0% to 3% by weight and more preferably at 0.1% to 2% by weight, based on the dry weight of the coating compositions. The use of fibers results in coatings having more strongly crack-bridging properties.

Typical adjuvants for the coating compositions are thickeners, examples being polysaccharides such as cellulose ethers and modified cellulose ethers, starch ethers, guar gum, xanthan gum, polycarboxylic acids such as polyacrylic acid and the partial esters thereof, and also polyvinyl alcohols, which optionally may have been acetalized or hydrophobically modified, and casein and associative thickeners. Customary adjuvants are also crosslinkers such as metal oxides or semimetal oxides, more particularly boric acid or polyborates, or dialdehydes, such as glutaraldehyde. Mention may also be made, furthermore, of the following: preservatives, film-forming assistants, dispersants, foam stabilizers, defoamers, plasticizers, flow control agents and flame retardants (e.g. aluminum hydroxide).

In general, the fraction of adjuvants as a proportion of the coating compositions overall is 0% to 20% by weight, preferably 0.1% to 15% by weight and more preferably 0.1% to 10% by weight, based in each case on the dry weight of the coating compositions.

The preparation of the coating compositions based on mineral binders, polymers, fillers and flexibilizers and optionally additives is not tied to any particular procedure or mixing apparatus. The coating compositions are obtainable by mixing of the individual ingredients of the formula in conventional powder mixing apparatus, as for example by means of mortar mixers, concrete mixers or plaster-mixing machines or stirrers, and homogenization. The individual ingredients are used generally in dry form at the mixing stage.

The polymers can be used in the form of aqueous dispersions, preferably in the form of water-redispersible powders or in the form of water-redispersible dispersion powder compositions.

The coating compositions may be provided in, for example, the form of one-component systems or two-component systems. One-component systems comprise all of the ingredients of the coating compositions. With one-component systems, the formulations are generally dry formulations. One-component systems are preferably produced by premixing polymers, flexibilizers, optionally additives and optionally adjuvants and admixing mineral binders and fillers at a later point in time. To produce the aqueous coating compositions, the water may be admixed at any later point in time, generally shortly prior to application of the coating compositions.

Two-component systems comprise a first component and a second component. The first component comprises all of the ingredients of the flexible coating compositions apart from polymers. The first component is generally a dry formulation. The second component comprises the polymers, preferably in the form of aqueous dispersions. For preparing the coating compositions, which may be aqueous, the first component and the second component are mixed, optionally with addition of water.

The coating compositions are suitable, for example, for use as grouts, construction adhesives, jointing mortars, repair mortars or renders.

The invention additionally provides processes for producing permanently flexible coatings by applying to a substrate coating compositions based on one or more mineral binders, one or more polymers, one or more fillers, and optionally one or more additives, characterized in that the coating compositions comprise 0.05% to 5% by weight, based on the dry weight of the coating compositions, of one or more flexibilizers selected from the group encompassing hydroxy compounds having 1 to 25 carbon atoms, carboxylic acid compounds having 1 to 25 carbon atoms, or salts thereof, hydroxy-carboxylic acid compounds having 1 to 25 carbon atoms, or salts thereof, phosphonic acids or salts thereof, and phosphoric acids or salts thereof, and at least 55% by weight of polymers, based on the dry weight of the polymers and of the mineral binders.

The permanently flexible coatings have coat thicknesses of preferably 1 to 10 mm, more preferably 2 to 5 mm and most preferably 2 to 3 mm.

These coating compositions may be applied to any substrates. The substrates may for instance be organic or inorganic, natural or synthetic. Examples of natural substrates are ground, rock, stone or screed. Examples of synthetic substrates are primarily substrates from the construction sector, such as substrates based on compositions comprising mineral binders, more particularly concrete or screed, but also timber materials, plastics materials, more particularly polyurethane foam boards, or metals, more particularly aluminum. Substrates from the construction sector are preferred.

The aqueous coating compositions may be applied by manual methods or mechanical methods. In the case of manual methods, the aqueous coating compositions are applied to the substrate with the aid of coarse brushes, fine brushes, rollers, knives, trowels, paddles or shovels. In the case of mechanical methods, the aqueous coating compositions are applied to the substrate by means of spraying machines, plaster-mixing machines or robots. Two or more coats of coating compositions may be applied one over another. It is preferred to apply only one coat of the coating compositions to a substrate. Following the application of coating compositions to the substrates, the surface of the applied coat may be smoothed, using smoothing disks or paddle smoothers, for example.

The coating compositions are applied typically at ambient temperatures, i.e. in general at temperatures from 0 to 50° C., more particularly from 5 to 35° C.

The substrates may be primed before the coating compositions are applied. Examples of suitable primers include aqueous dispersions of the above-mentioned polymers, preferably with solids contents of 10% to 50%.

Finally, further coats may be applied to the permanently flexible coatings of the invention, such as, for example, paint coatings or claddings or coverings of tiles or slabs for interiors or exteriors. Also contemplated are coatings of floor-filling compounds or screeds. In many cases, however, the coatings of the invention constitute the uppermost or finishing coat.

The coating compositions are used preferably for producing permanently flexible coatings for roofs, canals, mines, tunnels, ponds or swimming pools, more preferably for producing roofs, canals or mines; and most preferably for producing roofs.

The coating compositions of the invention result, surprisingly, in permanently flexible coatings which, as compared with conventional, mineral coatings, exhibit improved elongation at break behavior and hence an improved crack-bridging capacity, countering embrittlement of the coatings. These statements are true in particular of coatings which are subject to wet or damp conditions. Accordingly the coatings obtainable in accordance with the invention are especially suitable for protecting built structures, for example, against penetration by water.

The examples which follow serve for detailed elucidation of the invention and should in no way be understood to constitute any restriction.

INVENTIVE EXAMPLE 1 (IEX. 1)

The coating composition was prepared by introducing the individual ingredients of the formula indicated below, in the following order, with mixing, into a Toni mixer (commercial laboratory mixer): first the portland cement, then the fillers, the dispersion powder and lastly the remaining additives. This was followed by homogeneous mixing on setting 1 for 15 minutes. The aqueous coating composition was produced from the resultant dry mix in the manner indicated in EN 196-1, with the amount of water stated in the formula.

The aqueous coating composition was applied to Teflon formwork components (base area: 30×15 cm) in a wet film thickness of 2 mm. The wet films were smoothed using a trowel. After storage for 24 hours under standard conditions in accordance with DIN 50014, the films had cured and, following removal from the Teflon formwork components, were subjected to the following storage conditions:
 one film was stored for 28 days under standard conditions (23° C./50% relative humidity) (dry storage);
 another, identical film, following the aforementioned dry storage, was stored for a further 38 days in mains water at 23° C. and thereafter for 28 days under standard conditions (23° C./50% relative humidity) (wet storage).

Formula of the coating composition:
10% by weight portland cement, CEM 142.5 N,
40% by weight dispersion powder Vinnapas® 4040 N (vinyl acetate-ethylene copolymer, stabilized with polyvinyl alcohol and a cationic protective colloid),
0.5% by weight highly disperse silica (Wacker HDK H 15),
0.5% by weight defoamer (Agitan P 800),
1.5% by weight inorganic phyllosilicate thickener (Optibent MF),
0.5% by weight sodium gluconate,
13.4% by weight Omyacarb 20 BG (carbonatic filler) and
33.6% by weight sand (0.063 to 0.3 mm; silicatic filler).

To 2 kg of dry mix of the above components, 640 ml of water were used.

COMPARATIVE EXAMPLE 2 (CEX. 2)

In analogy to Inventive Example 1, with the difference that the formula and amount of water used for preparing the coating composition were as follows:
10% by weight portland cement CEM 142.5 N,
20.5% by weight dispersion powder Vinnapas® 4040 N (vinyl acetate-ethylene copolymer, stabilized with polyvinyl alcohol and a cationic protective colloid),
20.5% by weight dispersion powder Vinnapas® 7055 N (vinyl acetate-vinyl ester-ethylene terpolymer, stabilized with polyvinyl alcohol),
0.5% by weight highly disperse silica (Wacker HDK H 15),
0.5% by weight defoamer (Silfoam SP 15),
48% by weight sand (0.063 to 0.3 mm; silicatic filler).

To 2 kg of dry mix of the above components, 560 ml of water were used.

COMPARATIVE EXAMPLE 3 (CEX. 3)

In analogy to Inventive Example 1, with the difference that the formula and amount of water used for preparing the coating composition were as follows:
10% by weight portland cement CEM 142.5 N,
30% by weight dispersion powder Vinnapas® 4040 N (vinyl acetate-ethylene copolymer, stabilized with polyvinyl alcohol),
0.5% by weight highly disperse silica (Wacker HDK H 15),
0.5% by weight defoamer (Agitan P 800),
1.5% by weight inorganic phyllosilicate thickener (Optibent MF),
57.5% by weight carbonatic and silicatic fillers.

To 2 kg of dry mix of the above components, 600 ml of water were used.

COMPARATIVE EXAMPLE 4 (CEX. 4)

In analogy to Inventive Example 1, with the difference that the formula and amount of water used for preparing the coating composition were as follows:
20% by weight portland cement CEM 142.5 N,
20% by weight dispersion powder Vinnapas® 4040 N (vinyl acetate-ethylene copolymer, stabilized with polyvinyl alcohol),
0.5% by weight highly disperse silica (Wacker HDK H 15),
0.5% by weight defoamer (Agitan P 800),
1.5% by weight inorganic phyllosilicate thickener (Optibent MF),
57.5% by weight carbonatic and silicatic fillers.

To 2 kg of dry mix of the above components, 500 ml of water were used.

Performance Testing

In accordance with ISO 527-3 (August 1995), 2 to 4 type 1 B standard rods were punched from each of the films obtained after dry storage and wet storage, from Inventive Example 1 and from Comparative Examples 2 to 4, respectively.

The tensile strength and elongation at break of the standard rods were then determined by means of a tensile test in accordance with ISO 527-3 (August 1995). The standard rods were stretched to failure at a tensioning speed of 50 mm/min. The results of the testing are set out in Table 1.

Wet storage of the inventive product, surprisingly, does not result in any significant change to the elongation at break value in comparison to the dry storage (Inventive Example 1). In the case of products produced noninventively, in contrast, the elongation at break values deteriorate dramatically as a result of wet storage (Comparative Examples 2 and 3). Coating compositions which include no greater amount of polymers than of mineral binder produce products whose elongation at break is unsatisfactory even on dry storage (Comparative Example 4).

TABLE

| | Tensile strength [N/mm²] | | Elongation at break [%] | |
|---|---|---|---|---|
| | Dry storage | Wet storage | Dry storage | Wet storage |
| IEx. 1 | 1.2 | 2.5 | 48 | 46 |
| CEx. 2 | 1.6 | 3.1 | 62 | 33 |
| CEx. 3 | 1.7 | 2.5 | 29 | 8 |
| CEx. 4 | 1.7 | n.d.* | 7.3 | n.d.* |

*: n.d.: not determined.

The invention claimed is:

1. A coating composition comprising:
2% to 30% of at least one mineral binder;
20% to 55% of at least one polymer, which is obtainable by radically initiated polymerization of at least one ethylenically unsaturated monomer selected from the group consisting of vinyl esters, (meth)acrylic esters, vinylaromatics, olefins, 1,3 dienes and vinyl halides, and optionally further monomers copolymerizable therewith;
10% to 70% of at least one filler;
0.05% to 3% of at least one flexibilizer selected from the group consisting of tartaric acid, gluconic acid, citric acid, fructose and saccharose; and optionally
at least one additive,
wherein all the above percentages are by weight based on a dry weight of the coating composition and total 100%, and wherein the at least one polymer is present in an amount of 60% to 98% by weight based on a dry weight of the at least one polymer and of the at least one mineral binder.

2. The coating composition of claim 1, wherein the coating composition comprises 70% to 98% by weight of the at least one polymer, based on the dry weight of the at least one polymer and of the at least one mineral binder.

3. The coating composition of claim 1, wherein the at least one polymer is selected from the group consisting of vinyl ester homopolymers, vinyl ester copolymers comprising one or more monomer units from the group encompassing vinyl esters, olefins, vinyl aromatics, vinyl halides, acrylic esters, methacrylic esters, fumaric and/or maleic monoesters or diesters, (meth)acrylic ester homopolymers, (meth)acrylic ester copolymers comprising one or more monomer units from the group encompassing methacrylic esters, acrylic esters, olefins, vinylaromatics, vinyl halides, fumaric and/or maleic monoesters or diesters, homopolymers or copolymers of dienes and ethene and optionally styrene, (meth) acrylic esters or the esters of fumaric or maleic acid, homopolymers or copolymers of vinylaromatics; and copolymers of vinylhalogen compounds.

4. The coating composition of claim wherein the coating composition comprises 30% to 50% by weight of the at least one polymer, based on the dry weight of the coating composition.

5. The coating composition of claim 4, wherein the at least one filler comprises a mixture of at least one silicatic filler and at least one carbonatic filler.

6. The coating composition of claim 5, wherein the coating composition comprises at least one additive selected from the group consisting of highly disperse silicas, phyllosilicates, pigments and fibers.

7. The coating composition of claim 1, wherein the coating composition comprises 30% to 50% by weight of the at least one polymer, based on the dry weight of the coating composition.

8. The coating composition of claim 1, wherein the at least one filler comprises a mixture of at least one silicatic filler and at least one carbonatic filler.

9. The coating composition of claim 1, wherein the coating composition comprises at least one additive selected from the group consisting of highly disperse silicas, phyllosilicates, pigments and fibers.

10. A process for producing a coating, said method comprising applying to a substrate at least one coating composition of claim 1.

11. The process of claim 10, wherein the coating has a coat thickness of 1 to 10 mm.

12. A coating composition comprising:
2% to 30% of at least one mineral binder;
30% to 50% of at least one polymer, which is obtainable by radically initiated polymerization of at least one ethylenically unsaturated monomer selected from the group consisting of vinyl esters, (meth)acrylic esters, vinylaromatics, olefins, 1,3 dienes and vinyl halides, and optionally further monomers copolymerizable therewith;
10% to 70% of at least one filler;
0.05% to 3% of at least one flexibilizer selected from the group consisting of oxalic acid, tartaric acid, gluconic acid, heptonic acid, gallic acid, citric acid, succinic acid, sebacic acid, salicylic acid, pimelic acid, hematic acid, malic acid, salts of the aforementioned acids, pentaerythritol, sorbitol, sucrose, glucose, fructose, disaccharides, tetrasodium pyrophosphate, tetrapotassium pyrophosphate and sodium hexametaphosphate (Graham's salt); and optionally
at least one additive,
wherein all the above percentages are by weight based on a dry weight of the coating composition and total 100%, and wherein the at least one polymer is present in an amount of 60% to 98% by weight based on a dry weight of the at least one polymer and of the at least one mineral binder.

* * * * *